(12) United States Patent
Møller et al.

(10) Patent No.: US 10,539,969 B2
(45) Date of Patent: Jan. 21, 2020

(54) COMMUNICATION SYSTEM FOR A HYDROGEN REFUELLING SYSTEM (71) Applicant: Nel Hydrogen A/S, Herning (DK)

(72) Inventors: Lars Møller, Herning (DK); Jørn Rosenlund, Haderslev (DK)

(73) Assignee: Nel Hydrogen A/S, Herning (DK)

( * ) Notice: Subject to any disclaimer, the term of this patent is extended or adjusted under 35 U.S.C. 154(b) by 182 days.

(21) Appl. No.: 15/442,673

(22) Filed: Feb. 26, 2017

(65) Prior Publication Data

US 2017/0248976 A1    Aug. 31, 2017

(30) Foreign Application Priority Data

Feb. 26, 2016 (DK) .................................. 2016 70112

(51) Int. Cl.
  G05D 7/06    (2006.01)
  F17C 5/06    (2006.01)
  F17C 13/02   (2006.01)
(52) U.S. Cl.
  CPC ............. G05D 7/0676 (2013.01); F17C 5/06 (2013.01); F17C 13/025 (2013.01); F17C 13/026 (2013.01); F17C 2221/012 (2013.01); F17C 2250/032 (2013.01); F17C 2250/034 (2013.01); F17C 2250/043 (2013.01); F17C 2250/0439 (2013.01); F17C 2250/0443 (2013.01); F17C 2250/0491 (2013.01); F17C 2270/0168 (2013.01)
(58) Field of Classification Search
  None
  See application file for complete search history.

(56) References Cited

U.S. PATENT DOCUMENTS

| 5,003,813 | A | * | 4/1991 | Hayes ..................... G01M 3/02 340/605 |
| 5,029,622 | A |   | 7/1991 | Mutter |
| 5,091,716 | A | * | 2/1992 | Nelson ................ G01M 3/2892 200/82 E |
| 6,755,225 | B1 |  | 6/2004 | Niedwiecki |
| 7,868,775 | B2 |  | 1/2011 | Sirosh |
| 9,347,614 | B2 |  | 5/2016 | Mathison |
| 2004/0163731 | A1 | | 8/2004 | Eichelberger |
| 2005/0000802 | A1 | | 1/2005 | Hobbs |
| 2006/0118175 | A1 | | 6/2006 | Mathison et al. |

(Continued)

FOREIGN PATENT DOCUMENTS

| CA | 2420571 A1 | 8/2004 |
| DE | 102013200330 A1 | 7/2014 |

(Continued)

*Primary Examiner* — Leon Viet Q Nguyen
(74) *Attorney, Agent, or Firm* — Bodi Law LLC (57) ABSTRACT

A HRS comprising at least a HRS center module, a HRS dispenser module and a first hydrogen supply line facilitating flow of hydrogen between the HRS center module and the HRS dispenser module, the HRS center module comprises a safety controller and a process controller, wherein data is communicated between the safety controller and safety components of the HRS dispenser module via a safety communication channel, and wherein data is communicated between the process controller and process components of the HRS dispenser module via a process communication channel.

20 Claims, 3 Drawing Sheets

(56) References Cited

U.S. PATENT DOCUMENTS

| | | | | |
|---|---|---|---|---|
| 2009/0072986 A1* | 3/2009 | Bussert | ............... | G05B 9/03 |
| | | | | 340/679 |
| 2013/0014855 A1* | 1/2013 | Yahashi | ............... | G01M 3/26 |
| | | | | 141/1 |
| 2013/0092243 A1* | 4/2013 | Mohammed | ........ | G01F 25/0053 |
| | | | | 137/2 |
| 2013/0139897 A1* | 6/2013 | Kim | ............... | F17C 5/007 |
| | | | | 137/2 |
| 2014/0076033 A1* | 3/2014 | Simmons | ............ | G01M 3/2892 |
| | | | | 73/40 |
| 2015/0308621 A1 | 10/2015 | Mathison | | |

FOREIGN PATENT DOCUMENTS

| | | |
|---|---|---|
| JP | 1996068497 | 10/1997 |
| JP | 1998169896 | 4/1999 |
| JP | 2005265067 | 3/2004 |
| JP | 2007239956 | 9/2007 |
| JP | 2008019996 | 1/2008 |
| WO | 2011012939 A1 | 2/2011 |
| WO | 2011049466 A1 | 4/2011 |

\* cited by examiner

COMMUNICATION SYSTEM FOR A HYDROGEN REFUELLING SYSTEM

CROSS REFERENCES TO RELATED APPLICATIONS

This application claims the benefit of Danish patent application No. PA 2016 70112 filed on Feb. 26, 2016, incorporated herein by reference.

FIELD OF THE INVENTION

The invention relates to a hydrogen refueling station having a data communication network comprising two individual communication channels.

BACKGROUND OF THE INVENTION

In recent years Hydrogen Refueling Stations (HRS) has emerged from prototypes towards serial produced HRS. During this journey the dispenser module has become an independent module separated from the HRS center module. Accordingly, this has led to some changes in the design of the HRS in its entirety but also in relation to maintenance, operation and safety of the individual modules.

SUMMARY

The invention relates to a Hydrogen Refueling Station (HRS; Hydrogen Refueling Station) comprising at least: a HRS center module, a HRS dispenser module, and a first hydrogen supply line facilitating flow of hydrogen between the HRS center module and the HRS dispenser module, characterized in that the HRS center module comprises a safety controller and a process controller, wherein data is communicated between the safety controller and safety components of the HRS dispenser module via a safety communication channel, and wherein data is communicated between the process controller and process components of the HRS dispenser module via a process communication channel.

A HRS center module preferably facilitates component facilitating refueling of a vehicle with hydrogen. Components of the HRS may include cooling system, compressor, internal hydrogen storage, valves for controlling flow of hydrogen from a hydrogen supply to a hydrogen output connectable to the vehicle, transducers for measuring pressure, flow, temperature etc. in the flow path, etc.

The dispenser module may be an integrated part of the HRS center module however at most sites it is preferred that the HRS center module and the HRS dispenser module is spaced with between 5 and 65 meters. This is mainly to obtain a design of the HRS comparable to the known fossil fuel refueling stations.

It should be mentioned that more than one HRS dispenser module may be connected to the HRS center module. The data communication setup may in such situation be similar to situations with only one HRS dispenser module i.e. direct between the HRS center module and the HRS submodule including hydrogen storage module. Alternatively, the communication between HRS center module and the HRS dispensers may be serial i.e. the second HRS dispenser module are communicating with the HRS center module via the first HRS dispenser module.

The safety controller and the process controller may be implemented in the same enclosure, however still the safety controller and process controller having individual microprocessors and what else is required to operate completely independent to reduce or eliminate one point of failure issues.

The control carried out by the safety controller is carried out by actuators referred to as final safety elements. The safety controller is not designed to control e.g. a refueling process but rather designed to bring the HRS from a unsafe state operation mode to a safe operation mode. The control carried out by the process controller is carried out by actuators referred to as final process elements. In contrary to the safety controller the process controller facilitates complete control of the HRS. The final process/safety elements are often valves.

Preferably the safety controller is only monitoring and changing mode of operation of the HRS. This is advantageous in that then only one controller is controlling the HRS but two controllers are monitoring the HRS and both having the authorization to change mode of operation to obtain a safer situation. Often this would mean limiting the operation of the HRS including stopping operation of the HRS.

According to an embodiment of the invention, the HRS further comprises a hydrogen storage module fluidly connected with a second hydrogen supply line, wherein data is communicated between the safety controller and safety components of the hydrogen storage module via a safety communication channel, and wherein data is communicated between the process controller and process components of the hydrogen storage module via a process communication channel. Preferably the hydrogen storage module is an external low pressure hydrogen storage from which the HRS can guide and pressure regulate hydrogen to internal buffer tanks where it is stored ready for refueling a vehicle.

According to an embodiment of the invention, the safety components and the process components are selected from the list comprising: valve, temperature sensor, pressure sensor, valve positioner, flow sensor, leakage sensor, UV/fire sensor. Preferably the safety and process components are identical components measuring or controlling the same values however installed at different locations. Thereby is obtained a two parallel control systems.

According to an embodiment of the invention, the safety components are communicating with the safety controller via safety I/O modules and wherein the process components are communicating with the process controller via process I/O modules. This is advantageous in that the two parallel control systems are then completely separated and one on a higher safety level than the other. This facilitates implementing a control system complying with requirements of the functional safety standard (IEC61508) standard and/or complying with at least the requirements at the safety integrity level (SIL; Safety Integrity Level) 2 preferably level 3 and thereby obtaining a SIL level 3 rated control system.

According to an embodiment of the invention, the HRS center module further comprises a center safety I/O module communicating with a dispenser safety I/O module and a center process I/O module communicating with a dispenser process I/O module.

According to an embodiment of the invention, a cable facilitates the communication between center safety I/O module and the dispenser safety I/O module and between the center process I/O module the dispenser process I/O module. This is advantageous in that only one physical cable has to be provided between the HRS center module and the submodules (dispenser and storage). Accordingly the dispenser I/O modules (safety and process) are communicating with the center I/O modules via one cable preferably via separate wire pairs Hence the safety and process communication channels are then maintained even though only one physical communication path exists between the HRS center module and the dispenser module.

The same principles may be used in communication between the center module and the hydrogen storage module or other HRS modules.

According to an embodiment of the invention, at least one of the safety and process communication channels is implemented as a cable feed between the HRS center module and HRS dispenser module below ground level. Preferably both the safety and process communication channels are individual cable or at least different pairs of wires in the same cable. The cables are preferably copper or aluminum cables but also optic cables could be used as well as wireless communication.

The same cables may be used in communication between the center module and the hydrogen storage module or other HRS modules.

According to an embodiment of the invention, the safety communication channels, using PROFINET, fail safe over EtherCAT or PROFIsafe communications protocols.

This is preferred in that communication via a safe communication protocols is important to reduce the risk of loss of data packages in the communication between modules.

The same rationale may be used to determine communication protocol in communication between the center module and the hydrogen storage module or other HRS modules.

According to an embodiment of the invention, the process communication channels are using EtherCAT communication protocol. The requirements to the process control data communication is not as high as to the safety data communication and therefore the EtherCAT or other similar non-safe communication protocols such as Profinet, Profibus Modbus, etc. could be used.

The same rationale may be used to determine communication protocol in communication between the center module and the hydrogen storage module or other HRS modules.

According to an embodiment of the invention, at least one of the safety and process communication channels is implemented as cables wherein the at least one cable is at least partly feed below ground level in a duct between the HRS center module and the HRS dispenser module, preferably in a cable pipe within the duct. A duct is very advantageous hence even though it is relatively expensive to establish, the protection of cables and pipes and accessibility hereto may count so much in favor for a duct that this is way of feeding cables and pipes is chosen.

According to an embodiment of the invention, the duct has a removable top cover. Preferably the duct is casted in concrete in a channel made between the modules. Such duct with removable top cover is advantageous in that cables in the duct are not exposed to deterioration from moisture and dirt and further protected from damages from future digging in the area above the cables. Further it is possible to access the duct to maintain or inspection of the cables or pipes in the duct.

Alternative to the duct is to dig the cable pipes in the ground and to have wells with at distance between to be able to assess the cables or pipes. Such wells are necessary especially when cables or pipes have to be joint underground to be able to inspect such joints.

Preferably the communication between the HRS center and other HRS modules are also feed in ducts.

According to an embodiment of the invention, the first hydrogen supply lines is at least partly feed in the duct between the HRS center module and the HRS dispenser module.

According to an embodiment of the invention, the duct also facilitates feeding hydrogen return line, hydrogen vent line, cooling line forward, cooling line return, and/or power cables. Power cable is preferably feed in a separate cable pipe to avoid electromagnetic coupling between data communication cables and power cables.

If the power cables large (e.g. above 16 or 25 mm2) the power cables may be fastened to brackets in the duct instead of feed in the cable pipes.

Preferably the duct is used to feed hydrogen and cooling pipes from the HRS center module to other HRS modules including the dispenser module. This is advantages in that pipes in the ducts are well protected from deterioration What is feed in the duct may depends on length between center module and other modules.

According to an embodiment of the invention, the hydrogen supply lines are grounded at least every 15 meter, preferably at least 10 meter, most preferably at least every 5 meter. This is advantageous to avoid electric potential and thereby avoid corrosion of the hydrogen pipes. Preferably all hydrogen and cooling pipes are grounded to make sure that the potential of the pipes are ground potential and to reduce problems of corrosion.

According to an embodiment of the invention, the duct is equipped with a hydrogen sensor for detecting leakages of hydrogen in the duct. The fact that the pipes are feed in a duct with air around is advantageous in that it is easier to detect if a pipe with hydrogen or cooling fluid such as $CO_2$ is leaking by means of a sensor.

If the duct has a slightly inclination leaked gases may be detected at the end of the duct in that the leaked gas will travel upwards or downwards depending on its weight compared to air.

Alternatively it is possible to mount a ventilator at one end of the duct to be able to change the air of the duct and thereby test the air leaving the duct if it contains any gases.

According to an embodiment of the invention, the hydrogen sensor is accessible via a well extending from ground level to the duct.

FIGURES

In the following, a few exemplary embodiments of the invention are described with reference to the figures, of which

DESCRIPTION OF THE INVENTION

A Hydrogen Refueling Station (HRS; Hydrogen Refueling Station) 1 is a refueling station for refueling of fuel cell vehicles (or boats, trains or aero plains). Typically the HRS 1 comprises a center module 2 preferably having component facilitating the control of the refueling of a vehicle with hydrogen. Components of the HRS center module 2 may include control units 5, 6, cooling system, compressor, internal hydrogen storage, valves for controlling flow of hydrogen from a hydrogen supply such as an external hydrogen storage or supply to a hydrogen output connectable to the vehicle, transducers for measuring pressure, flow, temperature etc. in the hydrogen flow path from hydrogen storage to vehicle.

The HRS 1 further comprises a dispenser module 3 which may be an integrated part of the HRS center module 2 however at most sites it is preferred that the HRS center module 2 and the HRS dispenser module 3 are spaced with between 5 and 65 meters. This is to obtain a design of the HRS 1 comparable to the known fossil fuel refueling stations and to increase safety in that main part of the handling and storage of hydrogen is happening at the hydrogen center module 2 distant from the end user refueling a vehicle.

It should be mentioned that more than one HRS dispenser modules 3 may be connected to the HRS center module 2. The data communication setup between control units 5, 6 of the HRS center module 3 and process and safety components 7, 9, 12, 14 of the HRS dispenser module 3 such as valves, sensors, I/O modules etc. may in such situation be similar to situations with only one HRS dispenser module 3 i.e. a communication bus or other wired or wireless communication to and from the control module 5, 6.

Figure 1:
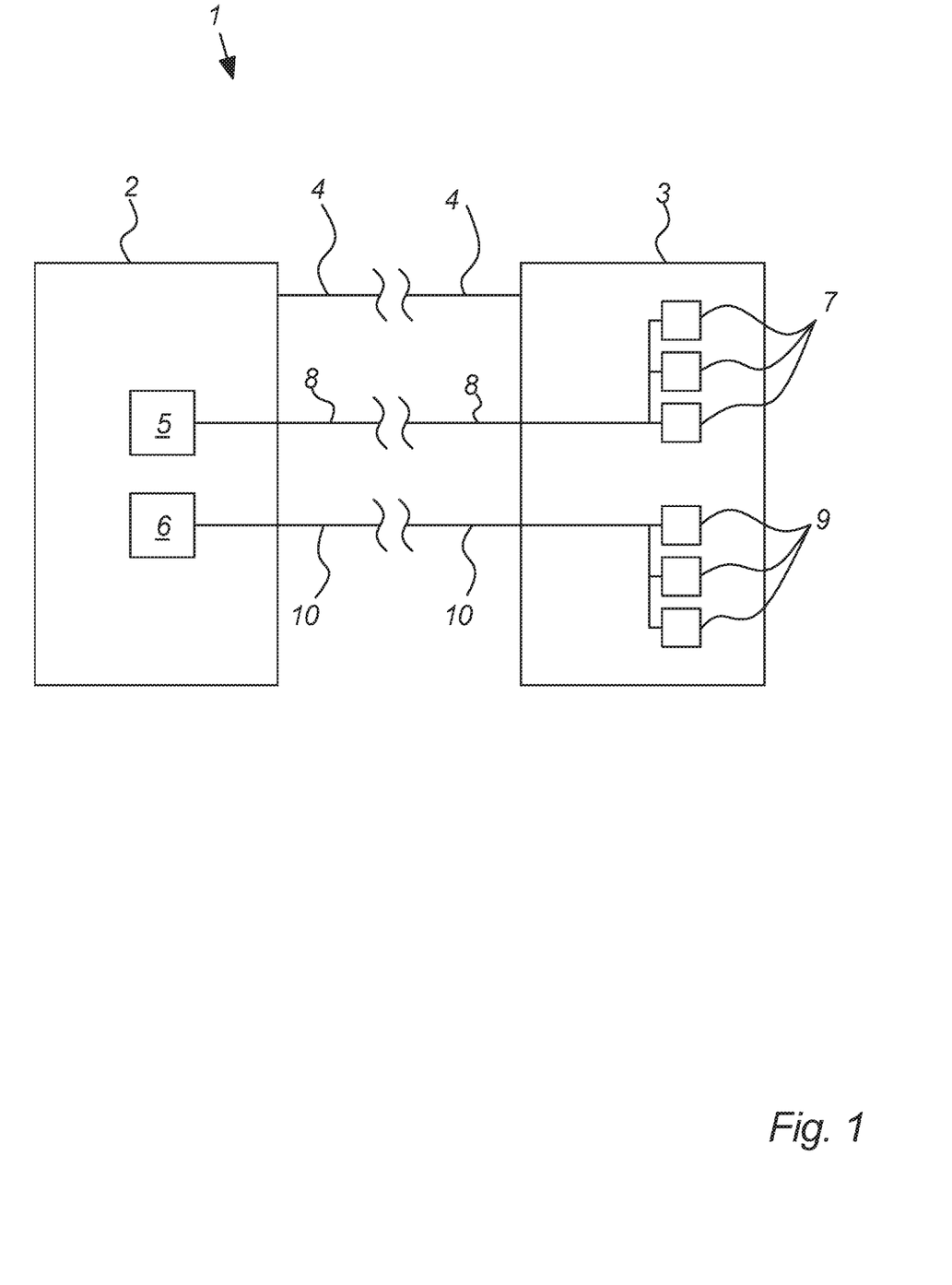
FIG. 1 illustrates communication between a HRS center module and a HRS dispenser module.
Figure 2:
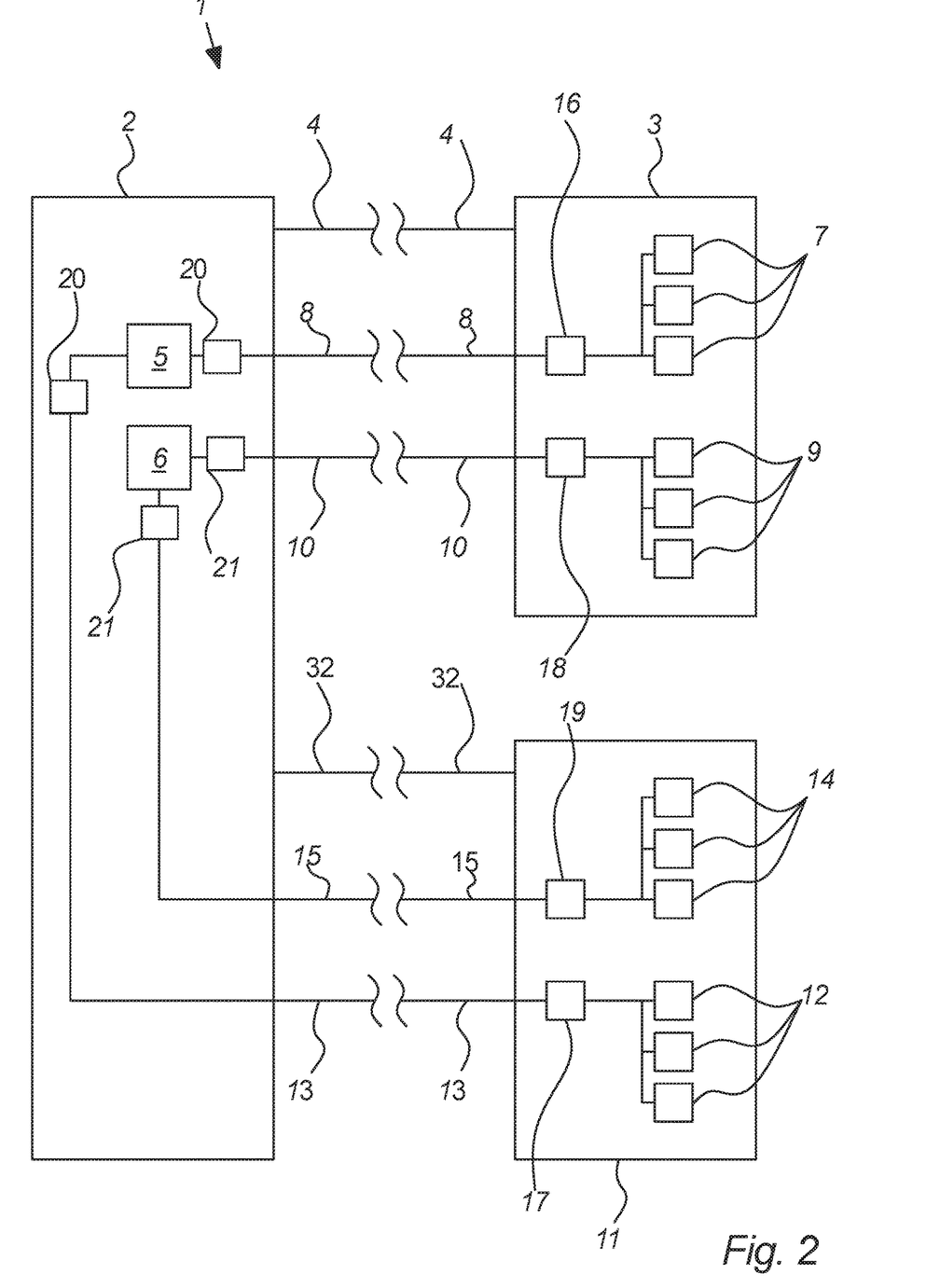
FIG. 2 illustrates communication between a HRS center module and a HRS dispenser module and a hydrogen storage module.

FIGS. 1 and 2 illustrates parts of a HRS 1 as described above. The parts illustrated are the parts which are of particular relevance for the present invention hence other not mentioned parts and functions may be necessary for the HRS 1 to operate properly.

The illustrated HRS 1 comprises a HRS center module 2 comprising a safety controller 5 and a process controller 6 and a HRS dispenser module 3 comprising safety components 7 and process components 9. The HRS center module 2 and the HRS dispenser module is fluidly connected by a pipe referred to as a hydrogen supply line 4 and exchange data via a safety communication channel 8 and a process communication channel 10.

The safety and process components may from a functional point of view be similar components e.g. from different manufactures. They may measure the same values at substantial the same location of the HRS 1. Examples of measuring devices could be transducers for monitoring pressure, temperature, flow, time, position of a valve (e.g. opened/closed), etc. This is advantageous in that malfunction of one transducer such as a temperature or pressure sensor does not in itself cause that this parameter is not monitored. Hence if one of the process and safety measuring devices are malfunctioning the other measures the parameter which then can be used in control of the HRS.

The safety controller 5 and the process controller 6 may communicate with each other. However it is preferred that the communication is unidirectional from the safety controller 5 to the process controller. Data/Information exchange between the controllers 5, 6 is preferably limited to status, values, mode of operation, etc. i.e. no interfering in the others control of the HRS 1. With this said if a safety issues occurs or may occur the safety controller may overrule the process controller if the process controller does not react on the safety issue.

This is advantageous in that then process controller 6 is notified and/or overruled by control actions carried out by the safety controller 5 and should therefore be allowed by the process controller 6. Accordingly the safety controller 5 has a higher control level than the process controller 6 allowing the safety controller 5 to overrule control of the process controller 6.

Preferably only safety status signals are communicated from the safety controller 5 to the process controller 6. Safety status signals could e.g. comprise information relating to control carried out by the safety controller such as tripping the operation of the HRS 1, status of the safety controller, etc.

Status of the safety controller 5 indicates the health (of the operation) of the HRS 1 hence only two safety statuses may be needed i.e. a normal operation status and an alarm operation status however a whole range of parameters and status may be provide to the process controller 6 form the safety controller 5.

In embodiments it may further advantageous that the process controller 6 is not able to communicate with the safety controller 5 in that then there is no risk of the safety controller 5 uses input from the process controller 6 in the safety control and monitoring. Thereby is obtained two completely separate monitoring and control system for increased safety of operation of the HRS.

Preferably, the software program on the safety controller 5 is different from the software program on the process controller 6. This is advantageous in that since the two software programs are not the same and preferably not made by the same programmer and preferably not executed on controllers of the same manufactures, the risk of the same error occurs in both controllers 5, 6 are reduced significantly. The controllers may be industrial programmable logic computers (known as PLCs) and industrial safety programmable logic computers (known as safety PLCs or safety controllers which are colored yellow). The invention is not limited to PLC's hence other controllers such as IPC's (Industrial Personal computer) or PAC's (programmable automation controller) may also be used.

In an embodiment, the two controllers 5, 6 may be in the same enclosure i.e. one PLC handling both safety and process related data. In the case the two controllers are physically the same enclosure they may use the same microprocessor however it is preferred that in this situation the PLC comprises one microprocessor dedicated to the safety control and one dedicated to the process control Preferably, the software program of the safety controller 5 implements a plurality of safety instrumented functions. Safety instrument functions should be understood as a number of outlined control functions which are critical to safety of the operation of the HRS 1. Hence in order to increase safety in relation to HRS 1 it is advantageous to increase monitoring and control in relation to these safety instrument functions. The safety instrument functions may monitor (and if needed control e.g. trip) leakages, vehicle vessel pressure, cooling system, pressure of hydrogen delivered to vehicle, etc. leading to a higher Safety Integrity Level rating/level.

The communication channels 8, 10 are preferably implemented as cables 8a, 10a however they do not have to be wired. The communication could be implemented at least partly as any kind of wireless communication and where allowed any kind of communication bus, etc.

It should be mentioned that data from the vehicle when connected to the dispenser module may be transferred e.g. by infrared receiver/transducer in the nozzle to the dispenser. At least part of the data received from the vehicle may be safety related which preferably is communicated to the to the safety controller 5 via the safety communication channel 8. Other data which is not safety related may be communicated to the process controller via the process communication channel 10. However to facilitate an easy implementation hereof a data splitter or switch can be used to split or copy the data from the vehicle in two so that both the safety controller 5 and the process controller 6 receives the all data from the vehicle.

FIG. 2 illustrates in addition to the HRS illustrated in FIG. 1 also a hydrogen storage module 11. The hydrogen storage module 11 may be implemented in the HRS center module 2 or as illustrated in FIG. 2 an external hydrogen supply fluidly connected to the HRS center module 2 by a pipe referred to as a hydrogen supply line 32.

The safety and process controllers 5, 6 of the HRS center module are communicating via safety and process communication channels 13, 15 with the safety and process components 12, 14 of the hydrogen storage module 11 similar to the communication described above between the HRS center module 2 and the HRS dispenser module 3.

At FIG. 2 extended I/O modules 16-19 are illustrated. These extended I/O modules are preferably also used in the communication described with reference to FIG. 1. The extended I/O modules 16-19 are advantageous in that they provide one point of access for the controllers 5, 6 to the component 7, 9, 12, 14. As illustrated at FIG. 2 but also applicable on FIG. 1, the safety controller 5 and process controller 6 communicates via center I/O modules 20, 21 to the process and safety components of the dispenser/storage modules 3, 11. The I/O modules 16-21 may facilitate communicating both analog and digital communication.

Figure 3:
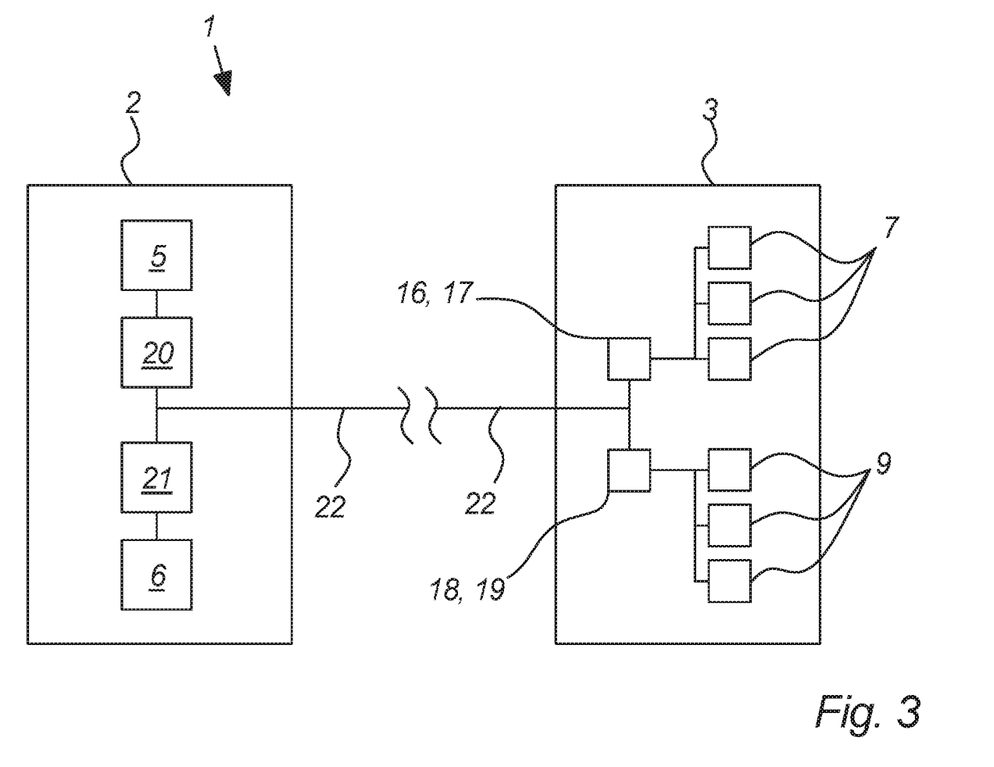
FIG. 3 illustrates implementation of communication channels.

FIG. 3 illustrates a HRS 1 as descried with reference to FIG. 1 however the HRS dispenser module 2 could be substituted or supplemented with a hydrogen storage module 11 in that FIG. 3 relates to communication between modules of the HRS 1.

Above the safety and process data is described as being communicate via separate communication channels which preferably are implemented as separate cables or at least separate wire pairs within the same cable. Thereby a complete separation of the safety communication from the process communication has been established. This is very advantageous in order to reduce likelihood of hazardous situations occurring or at least in order to be able to detect and control the operation of the HRS 1 proper in such situation.

The divided communication topology described with reference to FIGS. 1 and 2 is not compromised by the embodiment illustrated in FIG. 3 even though only one cable 22 is illustrated.

To achieve this, the hardware in both ends of the cable 22 has to facilitate a separation of data communicated over the cable 22. The separation of data in safety related data to and from the safety controller 5 and process related data to and from the process controller 6 is according to this embodiment necessary to obtain or maintain independency between the monitoring and control of the safety controller 5 and the process control 6.

According to an embodiment of the invention this is achieved by letting the safety controller 5 and process controller 6 communicate with the safety I/O module 16, 17 and process I/O module 18, 19.

The embodiment illustrated in FIG. 3 can be implemented by having a safety controller communicating with a process controller directly or via I/O modules (the latter is illustrated).

It is preferred to feed cables and pipes between the HRS center module 2 and the HRS dispenser module 3 under ground level 23 in order of protection hereof from the environment, from tall obstacles e.g. on a truck, etc.

Figure 4:
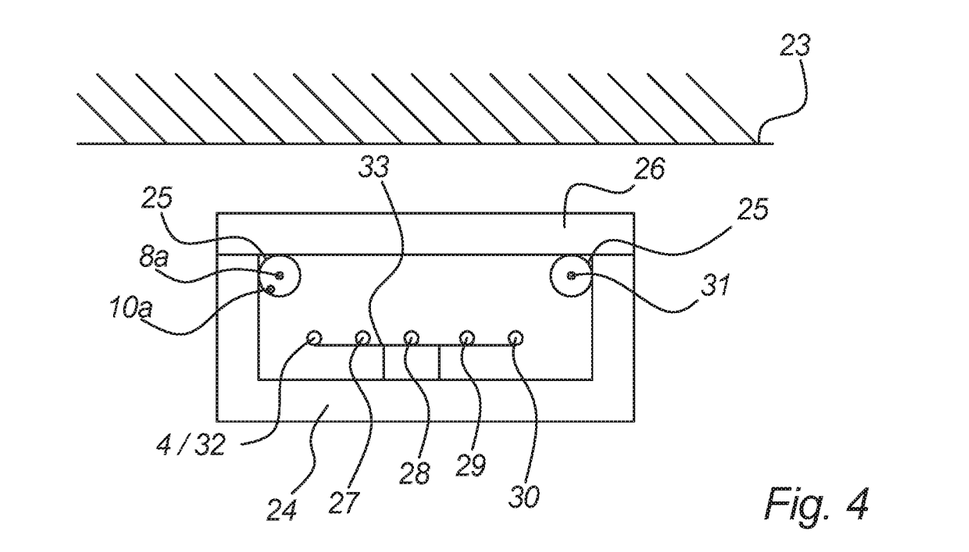
FIG. 4 illustrates implementation of communication channels, power cables, hydrogen pipes and cooling pipes.

A channel may be provided in the ground wherein cables and pipes are put before covered with soil. FIG. 4 illustrates an alternative hereto where the communication channels 8, 10, 13, 15 in the form of cables 8a, 10a, 13a, 15a can be installed between the HRS center module 2 and the dispenser module 3 according to a preferred embodiment of the invention.

FIG. 4 illustrates a cross section of a duct 24. According to an embodiment, the duct has concrete or plastic walls and top cover 26, the latter facilitating easy access to the duct 24. The duct may be provided with brackets 33 to which cables and pipes can be mounted and thereby safely fixed.

FIG. 4 illustrates a plurality of different pipes which may be provided in the duct 24 such as e.g. the hydrogen supply lines 4, 32, a hydrogen return line 27, a hydrogen vent line 28, a cooling line forward 29, a cooling line return 30, and/or power cables 31.

In addition to the brackets 33, cable guides 25 in the form of hollow tubes may also be mounted in the duct 24. In these cable guides 25 the fragile data communication cables 8a, 10a, 13a, 15a may be feed protected from the surroundings.

To prevent the electromagnetic coupling between e.g. the power cable 31 and the data cables 8a, 10a, 13a, 15a these are preferably feed with as much space between as possible. Further the data cables 8a, 10a, 13a, 15a is preferably shielded.

Further to prevent or reduce risk of corrosion of the hydrogen pipes 4, 32, 27, 28 and cooling pipes 29, 30 these pipes are grounded i.e. the electric potential among the pipes and ground (earth potential) is grounded. This is done by attaching a wire to each of the pipes 27-30 and to a metal stick provide at least 1 meter into the ground. Such grounding is preferably done for each 5 to 15 meters along the length of the duct 24.

It should be mentioned that no matter whether cables and/or pipes are feed in a duct 24, in cable guides 25 in the ground or directly in the ground they may be accessed by wells provided between the HRS center module 2 and the HRS dispenser module 3.

In addition to the description above of the HRS 1 it should be mentioned that preferably the process controller 6 but also the safety controller 5 may facilitate communication with an external data processor (not illustrated)

As can be understood from the above description, the communication system described is advantageous sin that it facilitates data communication such as monitoring and control via two separate communication channels 8, 10, 13, 15 from the HRS center module 2 and to a dispenser module 3, storage module 11 and other not mentioned or illustrated modules. Thereby it remains possible to trip the HRS in a safe manner even if one of communication channel between HRS center module 2 and a sub module 3, 11 fails. Further measurements from the first communication channel 8, 13 may be used in the control performed via the second communication channel 10, 15 and vice versa. With this said it is preferred that the process controller 6 do not interrupt the control performed by the safety controller 5. However it is appreciated that the safety controller 5 in case the process controller does not act on what is or may evolve to a hazardous situation takes over the control preferably by tripping the operation of the HRS 1.

LIST OF REFERENCE NUMBERS

1. Hydrogen Refueling Station (HRS)
2. HRS center module
3. HRS dispenser module
4. First hydrogen supply line (between 2 and 3)
5. Safety controller 6. Process controller
7. Safety components (of the dispenser module)
8. Safety communication channel (between 2 and 3)
    8a. Safety communication channel implemented as a cable
9. Process components (of the dispenser module)
10. Process communication channel (between 2 and 3)
    10a. Process communication channel implemented as a cable
11. Hydrogen storage module
12. Safety components (of the hydrogen storage module, similar to 7)
13. Safety communication channel (between 2 and 11)
    13a. Safety communication channel implemented as a cable
14. Process components (of the hydrogen storage module, similar to 9)
15. Safety communication channel (between 2 and 11)
    15a. Safety communication channel implemented as a cable
16. Safety I/O module (at dispenser module)
17. Safety I/O module (at hydrogen storage module)
18. Process I/O module (at dispenser module)
19. Process I/O module (at hydrogen storage module)
20. Safety I/O module (at center module)
21. Process I/O module (at center module)
22. Communication cable (between 2 and 3/11)
23. Ground level
24. Duct
25. Cable guide (e.g. hollow tube)
26. Top cover for duct
27. Hydrogen return line
28. Hydrogen vent line
29. Cooling line forward
30. Cooling line return
31. Power cables
32. Second hydrogen supply line (between 2 and 11)
33. Brackets

What is claimed is:

1. A Hydrogen Refueling Station (HRS; Hydrogen Refueling Station) comprising at least:
    a HRS center module,
    a HRS dispenser module, and
    a first hydrogen supply line facilitating flow of hydrogen between the HRS center module and the HRS dispenser module, wherein
    the HRS center module comprises a safety controller and a process controller, wherein the software program on the safety controller is different from the software program on the process controller,
    wherein the software program of the safety controller implements a plurality of safety instrumented functions established to monitor the operation of the HRS performed by the process controller,
    wherein data is communicated between the safety controller and safety components of the HRS dispenser module via a safety communication channel,
    wherein data is communicated between the process controller and process components of the HRS dispenser module via a process communication channel wherein the safety communication channel and the process communication channel are two separate communication channels, and
    wherein one of the safety components and one of the process components are measuring the same value of the HRS.

2. A HRS according to claim 1, wherein the HRS further comprises a hydrogen storage module fluidly connected with a second hydrogen supply line,
    wherein data is communicated between the safety controller and safety components of the hydrogen storage module via a safety communication channel, and
    wherein data is communicated between the process controller and process components of the hydrogen storage module via a process communication channel.

3. A HRS according to claim 1, wherein the safety components and the process components are selected from the list comprising: valve, temperature sensor, pressure sensor, valve positioner, flow sensor, leakage sensor, UV/fire sensor.

4. A HRS according to claim 1, wherein the safety components are communicating with the safety controller via safety I/O modules and wherein the process components are communicating with the process controller via process I/O modules.

5. A HRS according to claim 1, wherein the HRS center module further comprises a center safety I/O module communicating with a dispenser safety I/O module and a center process I/O module communicating with a dispenser process I/O module.

6. A HRS according to claim 5, wherein a cable facilitates the communication between center safety I/O module and the dispenser safety I/O module and between the center process I/O module and the dispenser process I/O module.

7. A HRS according to claim 1, wherein at least one of the safety and process communication channels is implemented as a cable feed between the HRS center module and HRS dispenser module below ground level.

8. A HRS according to claim 1, wherein the safety communication channels using PROFINET fail safe over EtherCAT or PROFIsafe communications protocols.

9. A HRS according to claim 1, wherein the process communication channels are using EtherCAT communication protocol.

10. A HRS according to claim 1, wherein at least one of the safety and process communication channels is implemented as cables, wherein at least one cable is at least partly feed below ground level in a duct between the HRS center module and the HRS dispenser module in a cable pipe within the duct.

11. A HRS according to claim 10, wherein the duct has a removable top cover.

12. A HRS according to claim 10, wherein the first hydrogen supply line is at least partly fed in the duct between the HRS center module and the HRS dispenser module.

13. A HRS according to claim 10, wherein the duct facilitates feeding a hydrogen return line, a hydrogen vent line, a cooling line forward, a cooling line return, and/or power cables.

14. A HRS according to claim 10, wherein the duct is equipped with a hydrogen sensor for detecting leakages of hydrogen in the duct.

15. A HRS according to claim 14, wherein the hydrogen sensor is accessible via a well extending from ground level to the duct.

16. A HRS according to claim 1, wherein the first hydrogen supply line is grounded at least every 15 meters.

17. A HRS according to claim 1, wherein the first hydrogen supply line is grounded at least every 10 meters.

18. A HRS according to claim 1, wherein the first hydrogen supply line is grounded at least every 5 meters.

19. A Hydrogen Refueling Station (HRS; Hydrogen Refueling Station) comprising at least:
- a HRS center module including a process controller and a safety controller, said safety controller configured to operate the HRS independently of said process controller;
- a HRS dispenser module separated by a distance from said HRS center module, said HRS dispenser module including process components controlled by said process controller and also including safety components controlled by said safety controller; and
- a first hydrogen supply line facilitating flow of hydrogen between the HRS center module and the HRS dispenser module;
- a safety communication channel providing data communications between said safety controller and said safety components; and
- a process communication channel providing data communications between the process controller and process components.

20. A Hydrogen Refueling Station (HRS; Hydrogen Refueling Station) comprising at least:
- a HRS center module including a process controller and a safety controller separate from said process controller;
- a HRS dispenser module separated by a distance from said HRS center module, said HRS dispenser module including process components controlled by said process controller and also including safety components controlled by said safety controller; and
- a first hydrogen supply line facilitating flow of hydrogen between the HRS center module and the HRS dispenser module;
- a safety communication channel providing data communications between said safety controller and said safety components via; and
- a process communication channel separate from said safety communication channel providing data communications between the process controller and process components, wherein
- at least one of the safety or said process communication channels is implemented as cable at least partly fed below ground level in a duct between the HRS center module and the HRS dispenser module in a cable pipe within the duct, said duct being equipped with a hydrogen sensor for detecting leakages of hydrogen in the duct.

* * * * *